United States Patent
Huang et al.

(10) Patent No.: US 11,972,218 B1
(45) Date of Patent: Apr. 30, 2024

(54) SPECIFIC TARGET-ORIENTED SOCIAL MEDIA TWEET SENTIMENT ANALYSIS METHOD

(71) Applicant: Jinan University, Guangzhou (CN)

(72) Inventors: Feiran Huang, Guangzhou (CN); Zihong Yang, Guangzhou (CN); Tingrong Zhi, Guangzhou (CN)

(73) Assignee: Jinan University, Guangzhou (CN)

( * ) Notice: Subject to any disclaimer, the term of this patent is extended or adjusted under 35 U.S.C. 154(b) by 0 days.

(21) Appl. No.: 18/497,062

(22) Filed: Oct. 30, 2023

(30) Foreign Application Priority Data

Oct. 31, 2022 (CN) .......................... 202211342234.5

(51) Int. Cl.
*G06F 40/30* (2020.01)
*G06N 3/08* (2023.01)
*G06N 20/00* (2019.01)
*G06Q 50/00* (2012.01)

(52) U.S. Cl.
CPC ............. *G06F 40/30* (2020.01); *G06N 20/00* (2019.01); *G06Q 50/01* (2013.01)

(58) Field of Classification Search
CPC .... G06F 40/211; G06F 40/253; G06F 40/268; G06F 40/284; G06F 40/30; G06N 3/08
See application file for complete search history.

(56) References Cited

U.S. PATENT DOCUMENTS 11,194,972 B1 * 12/2021 Tao .......................... G06N 3/08
11,238,332 B2 * 2/2022 Ainslie .................. G06N 3/084
11,262,984 B2 * 3/2022 Svyatkovskiy ......... G06F 17/18
11,521,149 B2 * 12/2022 Socolof .................. H04N 21/84
11,551,042 B1 * 1/2023 Yu ........................ G06V 10/806
(Continued)

FOREIGN PATENT DOCUMENTS

CN 112329449 A 2/2021
CN 114648031 A 6/2022

OTHER PUBLICATIONS

CNIPA, Notification of First Office Action for CN202211342234.5, dated Dec. 7, 2022.
(Continued)

*Primary Examiner* — Lamont M Spooner

(57) ABSTRACT

A specific target-oriented social media tweet sentiment analysis method includes: preprocessing social media tweet data to obtain a target text and a specific target; passing the target text and the specific target through an embedding layer to obtain target text word vectors and obtain a specific target word vector, respectively; passing the target text word vectors through a self-attention structure to obtain a self-attention result; combining the self-attention result with the specific target word vector and passing through a cross-attention structure to obtain cross-attention results; concatenating the cross-attention results to obtain an attention representation matrix; and passing the attention representation matrix through a pooling layer, a fully connected layer and a softmax layer to obtain a sentiment tendency of the specific target. The method, based on an attention mechanism in the transformer structure, fuses a local attention mechanism and an attention mechanism containing position information, the analysis accuracy is improved.

14 Claims, 4 Drawing Sheets

(56) References Cited

U.S. PATENT DOCUMENTS

| | | | |
|---|---|---|---|
| 11,636,554 B2* | 4/2023 | Nassar | G06Q 50/01 |
| | | | 705/319 |
| 11,720,346 B2* | 8/2023 | Wu | G06F 8/70 |
| | | | 707/741 |
| 11,797,591 B2* | 10/2023 | Galle | G06F 40/58 |
| 11,853,700 B1* | 12/2023 | Funk | G06N 20/00 |
| 2011/0078167 A1* | 3/2011 | Sundaresan | G06F 16/5846 |
| | | | 707/765 |
| 2014/0250032 A1* | 9/2014 | Huang | G06N 20/00 |
| | | | 706/12 |
| 2017/0083520 A1* | 3/2017 | Huang | G06F 16/9535 |
| 2017/0286397 A1* | 10/2017 | Gonzalez | G06F 40/211 |
| 2019/0251431 A1* | 8/2019 | Keskar | G06F 40/30 |
| 2019/0355270 A1* | 11/2019 | McCann | G06N 3/044 |
| 2021/0049236 A1* | 2/2021 | Nguyen | G06F 40/205 |
| 2021/0150594 A1* | 5/2021 | Zhu | G06Q 30/0282 |
| 2021/0182489 A1* | 6/2021 | Barkan | G06N 3/08 |
| 2021/0312135 A1* | 10/2021 | Meng | G06N 3/02 |
| 2021/0365773 A1* | 11/2021 | Subramanian | G06F 40/166 |
| 2022/0129636 A1* | 4/2022 | Baughman | G06F 16/248 |
| 2022/0405480 A1* | 12/2022 | Huang | G06F 40/166 |
| 2023/0118506 A1* | 4/2023 | Song | G06N 20/00 |
| | | | 704/9 |
| 2023/0245651 A1* | 8/2023 | Wang | G10L 13/027 |
| | | | 704/275 |
| 2023/0252301 A1* | 8/2023 | Volkovs | G06F 9/3555 |
| | | | 712/7 |
| 2023/0306205 A1* | 9/2023 | Maeder | G06F 16/3344 |

OTHER PUBLICATIONS

Jinan University (Applicant), Reply to Notification of First Office Action for CN202211342234.5, w/ (allowed) replacement claims, dated Dec. 21, 2022.

CNIPA, Notification to grant patent right for invention in CN202211342234.5, dated Jan. 6, 2023.

\* cited by examiner

SPECIFIC TARGET-ORIENTED SOCIAL MEDIA TWEET SENTIMENT ANALYSIS METHOD

CROSS-REFERENCE TO RELATED APPLICATION

This application claims priority to Chinese Patent Application No. 202211342234.5, filed on Oct. 31, 2022, the disclosure of which is incorporated herein by reference in its entirety.

TECHNICAL FIELD

The invention relates to the field of deep learning and natural language processing, and particularly to a specific target-oriented social media tweet sentiment analysis method.

BACKGROUND

At present, in the era of rapid development of the Internet, a huge amount of tweet text data are generated on social media every day. The amount of information contained in individual text data of these tweets is also increasing, that is, there are different sentiments for multiple entities in each sentence. Sentiment analysis for specific targets plays an important role in the analysis of social media public opinion. For example, in the sentence "although the weather is not good today, the scenery of the West Lake is still very good", sentiment information for "weather" and "West Lake" are different, in this case, traditional sentiment analysis methods are no longer applicable to the whole sentence.

In addition, the traditional sentiment analysis methods for specific targets have weak generalization, that is, effects for different text data types are different. Traditional methods based on feature engineering and traditional machine learning require a lot of time on data processing, and these methods are slow in speed and have poor generalization ability. With the development of deep learning, a method based on recurrent neural network (RNN) has also been introduced into this field. The RNN can obtain hidden states and position information in the text, which is very helpful for sentiment analysis of specific targets. However, structural characteristics of the RNN destine that the model runs slowly and cannot obtain long-distance semantic information. In recent years, a structure based on transformer has achieved great success in the field of natural language processing, and some studies have applied the transformer to the task field, but these models ignore the importance of local semantics and position information of specific targets.

Therefore, there is a need of providing a specific target-oriented social media tweet analysis method to improve the accuracy of sentiment analysis of specific target and the effect of public opinion analysis.

SUMMARY

In view of the above defects, embodiments of the invention provide a specific target-oriented social media tweet sentiment analysis method, which based on an attention mechanism in the transformer structure, fuses a local attention mechanism and an attention mechanism containing position information, thereby improves the accuracy of sentiment analysis of specific target; moreover, a manner of establishing dictionaries for a specific field of social media in data preprocessing makes it more suitable for sentiment analysis of social media tweets; and in addition, a general method of building dictionaries is used, it can improve the generalization ability of model by adjusting the dictionary in any field.

In a first aspect, an embodiment of the invention provides a specific target-oriented social media tweet sentiment analysis method, including:
preprocessing social media tweet data to obtain a target text and a specific target;
passing the target text through an embedding layer to obtain target text word vectors, and passing the specific target through the embedding layer to obtain a specific target word vector;
passing the target text word vectors through a self-attention structure to obtain a self-attention result;
combining the self-attention result with the specific target word vector and passing through a cross-attention structure to obtain cross-attention results;
concatenating the cross-attention results to obtain an attention representation matrix; and
passing the attention representation matrix sequentially through a pooling layer, a fully connected layer and a softmax layer to obtain a sentiment tendency result of the specific target.

As an implementation, in the first aspect of the invention, the preprocessing social media tweet data includes:
cleansing the social media tweet data to delete symbols, garbage characters and duplicated data information in the social media tweet data and thereby obtain the target text;
performing word segmentation processing on the target text to obtain text word sequences; and
converting the text word sequences into text vectors to obtain the target text word vectors.

As an implementation, in the first aspect of the invention, before the preprocessing social media tweet data, the specific target-oriented social media tweet sentiment analysis method further includes: constructing related dictionaries; the related dictionaries include a target key dictionary, a target sentiment dictionary, and a word segmentation dictionary;
constructing the target key dictionary includes:
selecting a corpus containing the target text, performing word segmentation and parts of speech tagging on the corpus by using an existing word segmentation library, and selecting required parts of speech; and
performing importance statistics on target words in the target text, inputting the target words of which importances each exceed a preset value into the target key dictionary, and establishing a stop word list and deleting invalid words;
constructing the target sentiment dictionary includes:
combining an existing sentiment dictionary with a manually constructed sentiment dictionary to obtain the target sentiment dictionary; and
obtaining a sentiment value of each sentiment word in the target sentiment dictionary; constructing the word segmentation dictionary includes:
combining the target key dictionary, the target sentiment dictionary and the existing word segmentation library to obtain the word segmentation dictionary; and
encoding segmentation words in the word segmentation dictionary to obtain segmentation word vectors.

As an implementation, in the first aspect of the invention, before the passing the attention representation matrix sequentially through a pooling layer, a fully connected layer and a softmax layer to obtain a sentiment tendency result of the specific target, the specific target-oriented social media tweet sentiment analysis method further includes:

constructing a bidirectional encoder representation from transformers (BERT) pre-training model of the target text, performing dimensionality reduction on the target text, and extracting vector representations containing semantic information, to obtain a unique vector corresponding to each word in the target text; and fusing sentiment information codes of the target text into the target sentiment dictionary to obtain the target text word vectors, but for a word not in the target sentiment dictionary, taking an average value of sentiment information code as the target text word vector.

As an implementation, in the first aspect of the invention, the passing the target text word vectors through a self-attention structure to obtain a self-attention result includes:

passing the target text word vectors through a local self-attention structure to obtain a local self-attention result;

passing the target text word vectors through a self-attention structure containing position information to obtain a position self-attention result; and combining the local self-attention result and the position self-attention result to obtain the self-attention result.

As an implementation, in the first aspect of the invention, the passing the target text word vectors through a local self-attention structure to obtain a local self-attention result includes:

acquiring interaction information between each word and a neighboring word thereof by the local self-attention structure, wherein an expression formula of the local self-attention structure is as follows:

$$\text{Attention}_{local} = \text{softmax}\left(\frac{(W_q \cdot x)K_A^T}{\sqrt{d}}\right)V_A$$

where, $K_A=(W_k \cdot x_i)_{i \in A}$, $V_A=(W_v \cdot x_i)_{i \in A}$, d represents a dimensionality of vector, $x_i$ represents a vector representation of the word at an ith position, and Attention$_{local}$ represents local attention;

wherein sizes of a key matrix $K_A$ and a value matrix $V_A$ of local self-attention matrices are restricted by a matrix A to obtain a local attention representation of one word; and an expression of the matrix A is as follows:

$$A=\{j-k, \ldots, j-1, j, j+1, \ldots, j+k, t\}$$

where, j represents a position of current word x, k represents a size of "local", t represents a position of the specific target; repeating this operation for each word in the social media tweet data, j in the matrix A is varied accordingly, and a single-head local self-attention result is obtained by concatenating all results;

using a multi-head local attention mechanism by: repeating the local self-attention structure at least three times, and choosing different the parameter matrices $W_q$, $W_k$, and $W_v$ to obtain multiple different local attention representations; and concatenating all the local attention representations, and performing parameter matrix projection to obtain the local self-attention result.

As an implementation, in the first aspect of the invention, the passing the target text word vectors through a self-attention structure containing position information to obtain a position self-attention result includes:

making the target text word vectors contain the position information through a bidirectional long short-term memory (Bi-LSTM) network;

a forward LSTM comprising an input gate, a forget gate and an output gate, passing the target text word vectors through the forward LSTM to obtain a word vector $\vec{h}_t$, processing the target text word vectors by a backward LSTM to obtain a word vector $\overleftarrow{h}_t$, and integrating the word vector $\vec{h}_t$ and word vector $\overleftarrow{h}_t$, wherein an integration function is as follows:

$$x_t = f(\overleftarrow{h}_t),$$

where, f is an operation of adding or concatenating into one vector, $X=\{x_1, x_2, \ldots, x_n\}$ represents a text vector containing position information;

performing a self-attention operation on the text vector, wherein an operation function is as follows:

$$\text{Attention}_{self} = \text{softmax}\left(\frac{Q \cdot K^T}{\sqrt{d}}\right)V,$$

where, d represents a dimensionality of vector, and Attention$_{self}$ represents self-attention;

multiplying the text vector by three parameter matrices individually to obtain a query matrix Q, a key matrix K and a value matrix V, thereby obtaining a single-head self-attention result; and obtaining multiple self-attention results by using different the query matrices Q, the key matrices K and the value matrices V, and performing concatenation and parameter matrix dimensionality-reduced projection on the multiple self-attention results to obtain the position self-attention result.

As an implementation, in the first aspect of the invention, the combining the self-attention result with the specific target word vector and passing through a cross-attention structure to obtain cross-attention results includes:

using the specific target word vector to perform cross-attention operations with the local self-attention result and the position self-attention result individually as follows:

$$\text{Attention}_{cross} = \text{softmax}\left(\frac{T \cdot K_c^T}{\sqrt{d}}\right)V_c$$

where, T represents a result of the specific target word vector passing through a parameterization matrix, $K_c$ and $V_c$ respectively represent results of passing the local self-attention result through two parameterization matrices individually, d represents a dimensionality of vector, and Attention$_{cross}$ represents cross-attention;

using different parameterization matrices to obtain multi-head cross-attention results, and using a parameterization matrix after concatenation of the multi-head cross-attention results to reduce a dimensionality of the result and thereby obtain a cross-attention result of the specific target vector and the local self-attention result; and modifying $K_c$ and $V_c$ as results of passing the position self-attention result through two parameterization matrices individually, to obtain a cross-attention result of the specific target vector and the position self-attention result;

wherein the attention representation matrix is obtained by concatenating the cross-attention result of the local self-attention result and the cross-attention result of the position self-attention result.

As an implementation, in the first aspect of the invention, the passing the attention representation matrix sequentially through a pooling layer, a fully connected layer and a softmax layer to obtain a sentiment tendency result of the specific target, includes:

passing the attention representation matrix through the pooling layer, and obtaining an output result of the pooling layer by using a maximum pooling method;

inputting the output result of the pooling layer into the fully connected layer to obtain a score value of each sentiment;

inputting the score value of each the sentiment into the softmax layer for operation to obtain a probability value of each the sentiment; and taking the sentiment with a maximum probability value as the sentiment tendency result of the specific target.

In a second aspect, an embodiment of the invention provides an electronic device, including: a memory stored with executable program codes, and a processor coupled to the memory; the processor is configured (i.e., structured and arranged) to call the executable program codes stored in the memory to perform the specific target-oriented social media tweet sentiment analysis according to any one of implementations of the first aspect of the embodiment of the invention.

Compared with the prior art, embodiments of the invention may achieve beneficial effects as follows.

The specific target-oriented social media tweet sentiment analysis method according to the embodiments of the invention, based on an attention mechanism in the transformer structure, fuses a local attention mechanism and an attention mechanism containing position information, thereby improves the accuracy of sentiment analysis of specific target. Moreover, the manner of establishing dictionaries for a specific field of social media in data preprocessing makes it more suitable for sentiment analysis of social media tweets; and in addition, a general method of building dictionaries is used, it can improve the generalization ability of model by adjusting the dictionaries in any field.

BRIEF DESCRIPTION OF DRAWINGS

In order to more clearly illustrate technical solutions in embodiments of the invention, drawings used in the embodiments will be briefly introduced below. Apparently, the drawings in the following description are only some embodiments of the invention, and for those skilled in the art, other drawings can be obtained according to these illustrated drawings without creative work.

DETAILED DESCRIPTION OF EMBODIMENTS

In the following, technical solutions of embodiments of the invention will be clearly and completely described with reference to the accompanying drawings of the embodiments of the invention. Apparently, the described embodiments are only some of embodiments of the invention, not all of embodiments of the invention. Based on the described embodiments of the invention, all other embodiments obtained by those skilled in the art without creative work are within the scope of protection of the invention.

It is noted that, terms such as "first", "second", "third", "fourth" in the specification and the appended claims are used for distinguishing different objects and not for describing a particular order. Terms "comprising", "including", "having" and any variations thereof in embodiments of the invention are intended to cover a non-exclusive inclusion, e.g., a process, method, system, product, or apparatus that includes a series of steps or elements is not necessarily limited to those steps or elements explicitly recited, but may include other steps or elements not expressly listed or inherent to such process, method, product, or apparatus.

Embodiment 1

Figure 1:
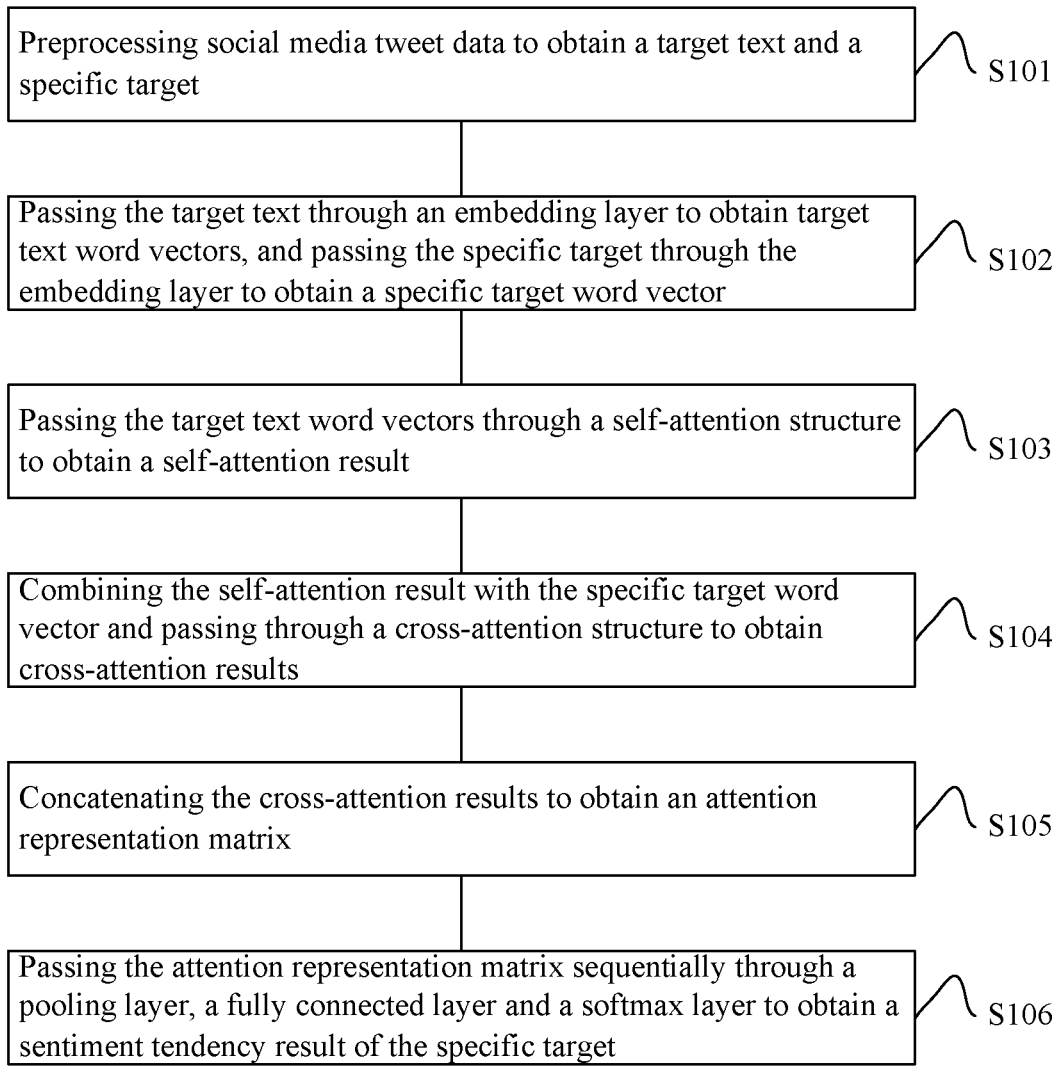
FIG. 1 illustrates a schematic flowchart of a specific target-oriented social media tweet sentiment analysis method according to an embodiment of the invention.
Figure 2:
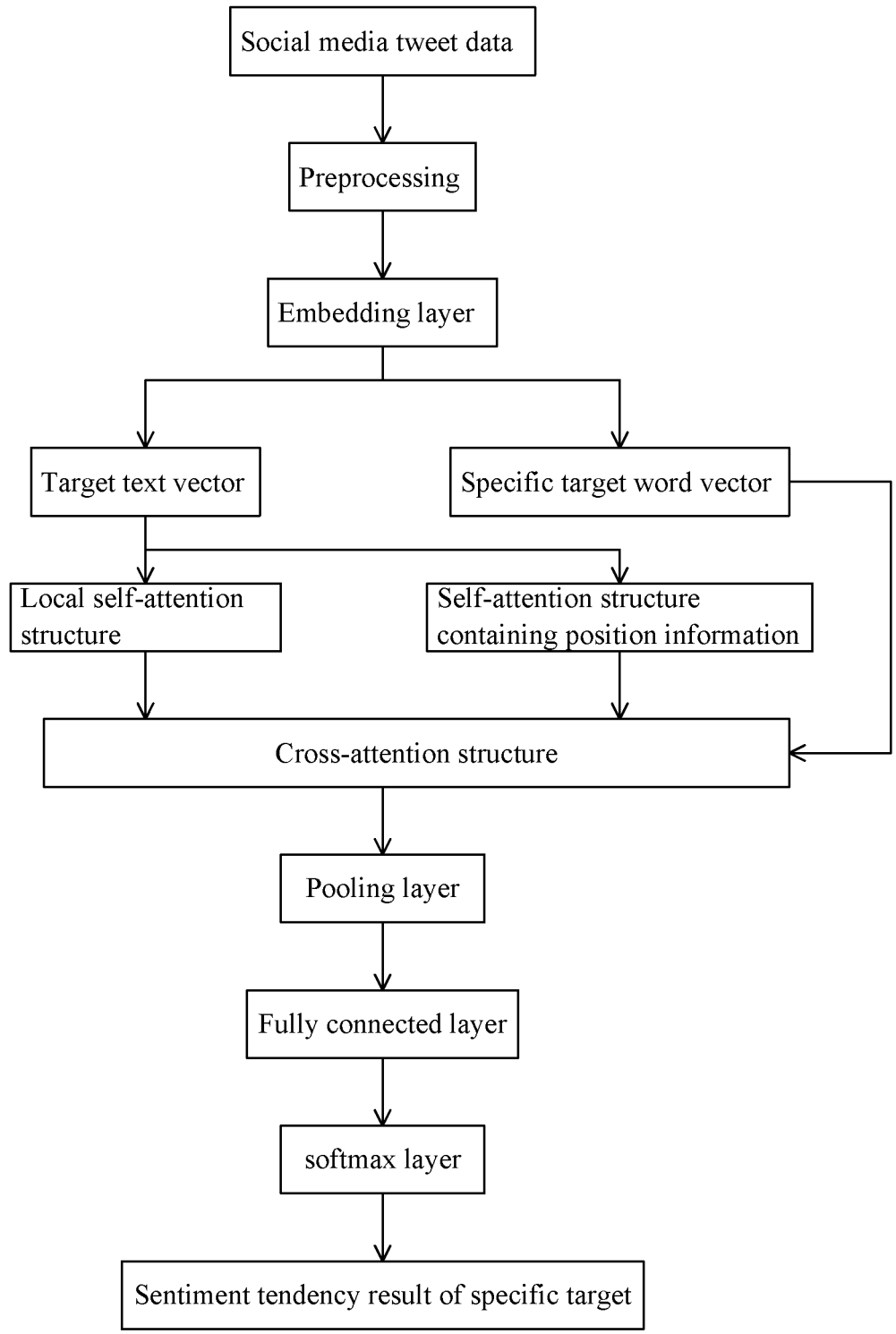
FIG. 2 illustrates a schematic framework diagram of a specific target-oriented social media tweet sentiment analysis method according to an embodiment of the invention.

Referring to FIG. 1, which is a schematic flowchart of a specific target-oriented social media tweet sentiment analysis method according to an embodiment of the invention. An executing body in the method described in the embodiment of the invention is an executing body composed of software or/and hardware; and the executing body can receive relevant information in a wired or/and wireless manner, and can send certain instructions. Of course, the executing body may also have certain processing and storage functions. The executing body may control a multiple (i.e., more than one) devices, such as remote physical servers or cloud servers and related software, or local hosts or servers that performs related operations on a device placed somewhere and related software. In some scenarios, the executing body may also control multiple storage devices, and the storage devices be co-located with the devices or placed in different locations from the devices.

As illustrated in FIG. 1, the specific target-oriented social media tweet sentiment analysis method includes steps S101 to S106 as follows.

S101, preprocessing social media tweet data to obtain a target text and a specific target.

Figure 3:
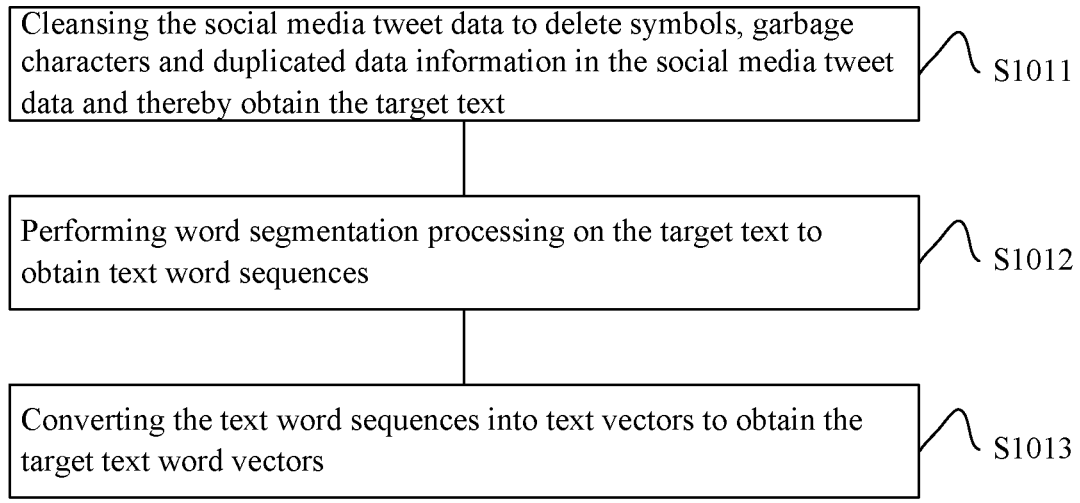
FIG. 3 illustrates a schematic flowchart of a data preprocessing in a specific target-oriented social media tweet sentiment analysis method according to an embodiment of the invention.

In an embodiment, as illustrated in FIG. 3, the preprocessing social media tweet data includes sub-steps S1011 to S1013 as follows.

S1011, cleansing the social media tweet data to delete symbols, garbage characters and duplicated data information in the social media tweet data and thereby obtain the target text. Social media tweets are generally obtained by using the web crawler technology, so the tweets will contain many network symbols and emoticons, e.g., emojis. The emojis are often used on the Internet to express related moods. At this situation, the emojis in the tweets need to be deleted and replaced with corresponding text explanations. In addition, the garbage characters and the duplicated data information are also a kind of text that often exists in tweets, and thus it is necessary to remove such kind of text that may have an impact on the analysis of tweets, in order to obtain compliant tweet data.

S1012, performing word segmentation processing on the target text to obtain text word sequences. Specifically, the sentiment analysis method requires the word segmentation processing in advance. In an illustrated embodiment, a jieba library is used to perform word segmentation on the target text to obtain a word sequence corresponding to each tweet. The jieba word segmentation is currently one of the better Chinese word segmentation components. The jieba word segmentation supports three modes of word segmentation (i.e., precise mode, full mode, and search engine mode), and supports custom dictionaries and traditional Chinese word segmentation.

S1013, converting the text word sequences into text vectors to obtain target text word vectors. Specifically, one-hot encoding is performed on the word sequence of each piece of data in the obtained tweets to obtain a vector representation of each word. The one-Hot encoding is also known as one-bit valid encoding, and a method thereof is to use N-bit state registers to encode N states, each of the N states has its own register bit, and only one bit is valid at any time. The one-hot encoding is that categorical variables serve as representations of binary vectors, which first requires that categorical values are mapped to integer values. Each the integer value is then represented as a binary vector, which is zero values except for the index of the integer that is labeled as 1. The use of the one-hot encoding may have the following advantages that: it is easier to design, it is easy to detect an illegal state, and it can efficiently use a large number of flip-flops in a FPGA. Compared with other encodings, using the one-Hot encoding to implement a state machine can typically achieve a higher clock frequency.

S102, passing the target text through an embedding layer to obtain target text word vectors, and passing the specific target through the embedding layer to obtain a specific target word vector.

In an embodiment, the passing the specific target through the embedding layer includes:
constructing a BERT (i.e., an abbreviation of Bidirectional Encoder Representation from Transformers) pre-training model of the target text, performing dimensionality reduction on the target text, and extracting vector representations containing semantic information, to obtain a unique vector corresponding to each word in the target text; and
fusing sentiment information codes of the target text into a target sentiment dictionary to obtain the target text word vectors, but for a word not in the target sentiment dictionary, taking an average value of sentiment information code as the target text word vector.

Moreover, further includes:
constructing a BERT pre-training model of the specific target, performing dimensionality reduction on the specific target, and extracting vector representations containing semantic information, to obtain a unique vector corresponding to each word in the specific target; and
fusing sentiment information codes of the specific target into the target sentiment dictionary to obtain the specific target word vectors, but for a word not in the target sentiment dictionary, taking an average value of sentiment information code as the specific target word vector.

S103, passing the target text word vectors through a self-attention structure to obtain a self-attention result.

Figure 4:
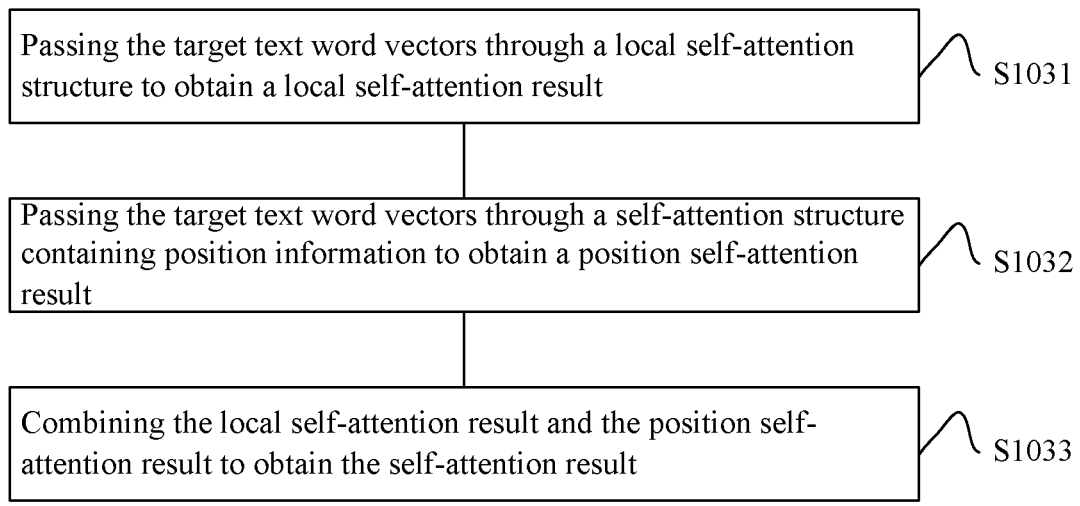
FIG. 4 illustrates a schematic flowchart of obtaining a self-attention result in a specific target-oriented social media tweet sentiment analysis method according to an embodiment of the invention.

In an embodiment, as illustrated in FIG. 4, the passing the target text word vectors through a self-attention structure includes sub-steps S1031 to S1033 as follows.

S1031, passing the target text word vectors through a local self-attention structure to obtain a local self-attention result.

More specifically, in some embodiments, the passing the target text word vectors through a local self-attention structure to obtain a local self-attention result includes: acquiring interaction information between each word and a neighboring word thereof by the local self-attention structure, wherein an expression formula of the local self-attention structure is as follows:

$$\text{Attention}_{local} = \text{softmax}\left(\frac{(W_q \cdot x)K_A^T}{\sqrt{d}}\right)V_A$$

where, $K_A=(W_k \cdot x_i)_{i \in A}$, $V_A=(W_v \cdot x_i)_{i \in A}$;
wherein sizes of a key matrix $K_A$ and a value matrix $V_A$ of local self-attention matrices are restricted by a matrix A to obtain a local attention representation of one word; and an expression of the matrix A is as follows:

$$A=\{j-k, \ldots, j-1, j, j+1, \ldots, j+k, t\}$$

where, j represents a position of current word x, k represents a size of "local", t represents a position of the specific target; repeating this operation for each word in the social media tweet data, j in the matrix A is varied accordingly, and a single-head local self-attention result is obtained by concatenating all results;
using a multi-head local attention mechanism by: repeating the local self-attention structure at least three times, and choosing different the parameter matrices $W_q$, $W_k$, and $W_v$ to obtain multiple different local attention representations; and
concatenating all the local attention representations, and performing parameter matrix projection to obtain the local self-attention result.

S1032, passing the target text word vectors through a self-attention structure containing position information to obtain a position self-attention result.

In some embodiments, the passing the target text word vectors through a self-attention structure containing position information to obtain a position self-attention result includes:
making the target text word vectors contain the position information through a bidirectional long short-term memory (Bi-LSTM) network; wherein a forward LSTM network at a moment t is expressed as follows:

$$i_t = \sigma(W_i[h_{t-1}, v_t] + b_i)$$

$$o_t = \sigma(W_o[h_{t-1}, v_t] + b_o),$$

$$f_t = \sigma(W_f[h_{t-1}, v_t] + b_f),$$

$$\tilde{c}_t = \tanh(W_c[h_{t-1}, v_t] + b_c),$$

$$c_t = i_t \odot \tilde{c}_t + f_t \odot c_{t-1},$$

$$h_t = o_t \odot \tanh(c_t),$$

where, $W_i$, $W_o$, and $W_f$ represent parameter matrices of different gates (e.g., an input gate, an output gate, and a forget gate), $b_i$, $b_o$, $b_f$, and be represent corresponding bias terms, σ and tanh represent activation functions, $i_t$ represents the input gate, $o_t$ represents the output gate, $f_t$ and $\tilde{c}_t$ represent the forget gate, $c_t$ represents a long-term memory, and $h_t$ represents a short-term memory;

passing the target text word vectors through the forward LSTM to obtain a word vector $\vec{h}_t$, processing the target text word vectors by a backward LSTM to obtain a word vect $\overleftarrow{h}_t$, and integrating the word vector $\vec{h}_t$ and word vect $\overleftarrow{h}_t$ as per an integration function as follows:

$$x_t = f(\overleftarrow{h}_t),$$

where, f is an operation of adding or concatenating into one vector, $X=\{x_1, x_2, \ldots, x_n\}$ represents a text vector containing position information;

performing a self-attention operation on the text vector, wherein an operation function is as follows:

$$\text{Attention}_{self} = \text{softmax}\left(\frac{Q \cdot K^T}{\sqrt{d}}\right)V;$$

multiplying the text vector by three parameter matrices individually to obtain a query matrix Q, a key matrix K and a value matrix V, thereby obtaining a single-head self-attention result; and obtaining multiple self-attention results by using different the query matrices Q, the key matrices K and the value matrices V, and performing concatenation and parameter matrix dimensionality-reduced projection on the multiple self-attention results to obtain the position self-attention result.

S1033, combining the local self-attention result and the position self-attention result to obtain the self-attention result.

S104, combining the self-attention result with the specific target word vector and passing through a cross-attention structure to obtain cross-attention results.

In some embodiments, the combining the self-attention result with the specific target word vector and passing through a cross-attention structure to obtain cross-attention results includes:

using the specific target word vector to perform cross-attention operations with the local self-attention result and the position self-attention result individually as follows:

$$\text{Attention}_{cross} = \text{softmax}\left(\frac{T \cdot K_c^T}{\sqrt{d}}\right)V_c$$

where, T represents a result of the specific target word vector passing through a parameterization matrix, $K_c$ and $V_c$ respectively represent results of passing the local self-attention result through two parameterization matrices individually;

using different parameterization matrices to obtain multi-head cross-attention results, and using a parameterization matrix after concatenation of the multi-head cross-attention results to reduce a dimensionality of the result and thereby obtain a cross-attention result of the specific target vector and the local self-attention result; and modifying $K_c$ and $V_c$ as results of passing the position self-attention result through two parameterization matrices individually, to obtain a cross-attention result of the specific target vector and the position self-attention result.

An attention representation matrix can be obtained by concatenating the cross-attention result of the local self-attention result and the cross-attention result of the position self-attention result.

S105, concatenating the cross-attention results to obtain an attention representation matrix.

S106, passing the attention representation matrix sequentially through a pooling layer, a fully connected layer and a softmax layer to obtain a sentiment tendency result of the specific target.

Figure 5:
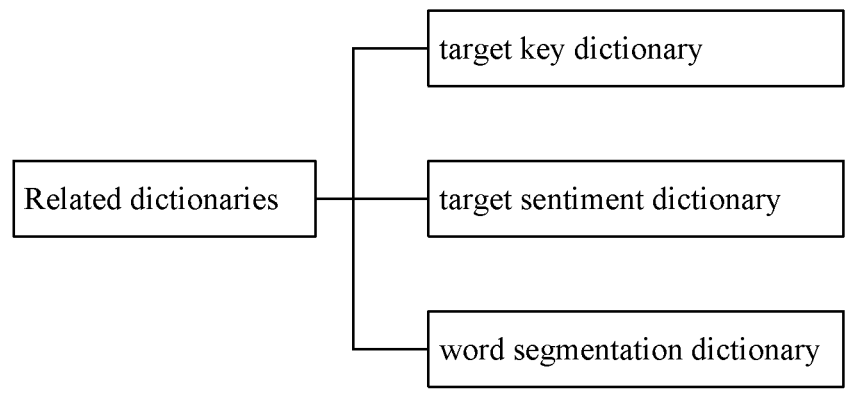
FIG. 5 illustrates a schematic diagram of a composition of related dictionaries in a specific target-oriented social media tweet sentiment analysis method according to an embodiment of the invention.

In some embodiments, before the preprocessing social media tweet data, the specific target-oriented social media tweet sentiment analysis method further includes: constructing related dictionaries; the related dictionaries include a target key dictionary, a target sentiment dictionary, and a word segmentation dictionary; as illustrated in FIG. 5.

Constructing the target key dictionary, includes:
  selecting a corpus containing the target text, performing word segmentation and parts of speech tagging on the corpus by using an existing word segmentation library, and selecting required parts of speech and
  performing importance statistics on target words in the target text, inputting the target words of which importances each exceed a preset value into the target key dictionary, and establishing a stop word list and deleting invalid words.

Constructing the target sentiment dictionary, includes:
  combining an existing sentiment dictionary with a manually constructed sentiment dictionary to obtain the target sentiment dictionary; and
  obtaining a sentiment value of each sentiment word in the target sentiment dictionary.

More specifically, a special dictionary is constructed for sentiment words expressing emotions, an existing sentiment dictionary is selected or a dictionary is manually constructed, a corpus of a specific target field (for example, the financial field will contain special sentiment words such as "limit up") is used, and adjectives, adverbs and so on are selected after parts-of-speech tagging. By combining the existing sentiment dictionary with the manually constructed dictionary, a sentiment dictionary that can be used for sentiment analysis of specific target in social media tweets can be constructed. Moreover, the sentiment value of each sentiment word (such as "positive", "negative") can be acquired by using an existing natural language processing library.

Constructing the word segmentation dictionary, includes:
  combining the target key dictionary, the target sentiment dictionary and the existing word segmentation library to obtain the word segmentation dictionary; and
  encoding segmentation words in the word segmentation dictionary to obtain segmentation word vectors. More specifically, each word in the word segmentation dictionary is given a unique numerical representation, which is used for one-hot encoding to obtain a vector representation of each word. In this way, the text word sequences are converted into vector representations of text, from which a one-hot vector representation of the specific target can be obtained.

In some embodiments, the passing the attention representation matrix sequentially through a pooling layer, a fully connected layer and a softmax layer to obtain a sentiment tendency result of the specific target, includes:

passing the attention representation matrix through the pooling layer, and obtaining an output result of the pooling layer by using a maximum pooling method; more specifically, commonly used pooling methods include maximum pooling and mean pooling; and in this illustrated embodiment, the maximum pooling method is used to aggregate information of respective dimensions in the multi-form attention results;

using vectors outputted from the pooling layer as input, and passing through the fully connected layer to obtain a score value of each sentiment (such as "positive", "negative", and "neutral");

inputting the score value of each the sentiment into the softmax layer for operation, to obtain a probability value of each the sentiment; and taking the sentiment with a maximum probability value as the sentiment tendency result of the specific target.

Embodiment 2

Figure 6:
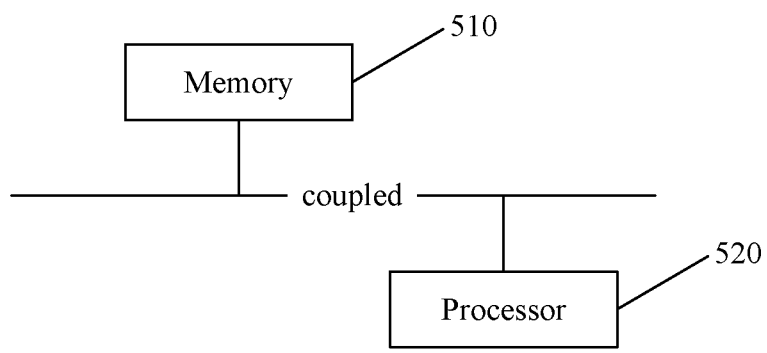
FIG. 6 illustrates a schematic structural view of an electronic device according to an embodiment of the invention.

Referring to FIG. 6, FIG. 6 illustrates a schematic structural view of an electronic device according to an embodiment of the invention. The electronic device may be a computer, a server, etc. Of course, under certain circumstances, it may also be an intelligent/smart device such as a mobile phone, a tablet computer, a monitoring terminal, etc., as well as an image acquisition device with a processing function. As illustrated in FIG. 6, the electronic device may include:

a memory 510 stored with executable program codes, and a processor 520 coupled to the memory 510;

the processor 520 is configured to call the executable program codes stored in the memory 510 to perform some or all of the steps in the specific target-oriented social media tweet sentiment analysis method according to the above embodiment 1.

An embodiment of the invention provides a computer readable storage medium, which is stored with a computer program. The computer program enables a computer to execute some or all of the steps in the specific target-oriented social media tweet sentiment analysis method according to the above embodiment 1.

An embodiment of the invention provides a computer program product, when the computer program product is run on a computer, the computer is caused to perform some or all of the steps in the specific target-oriented social media tweet sentiment analysis method according to the above embodiment 1.

An embodiment of the invention provides an application publishing platform, the application publishing platform is configured for publishing a computer program product, and when the computer program product is run on a computer, the computer is enabled to execute some or all of the steps in the specific target-oriented social media tweet sentiment analysis method according to the above embodiment 1.

In the various embodiments of the invention, it should be understood that, magnitudes of sequence numbers of respective processes do not necessarily mean an order of execution, and an order of execution of the processes should be determined by their functions and internal logics, and should not constitute any limitation to the implementation process of the embodiments of the invention.

The units described as separate components may or may not be physically separated, and the components shown as units may or may not be physical units, i.e., located in one place, or distributed across multiple network units. Some or all of the units can be selected according to actual needs to achieve the purpose of the embodiments of the invention.

In addition, functional units in various embodiments of the invention may be integrated in one processing unit, or the units may physically exist separately, or two or more of the units may be integrated in one unit. The integrated unit can be implemented in the form of hardware, or software function unit, or implemented in the form of a software functional unit.

The integrated unit, if implemented as a software functional unit and sold or used as an individual product, may be stored in a computer accessible memory. Based on such understanding, the technical solution of the invention, in essence, or in other words, the part better than the prior art, or all or part of the technical solution, may be embodied in the form of a software product, and the computer software product is stored in a memory and includes a number of requests to enable a computer device (which may be a personal computer, a server, or a network device, etc., in particular, a processor in a computer device) to perform some or all of the steps of the method described in the various embodiments of the invention.

In the embodiments according to the invention, it should be understood that, "B corresponding to A" means that B is associated with A, and B can be determined based on A. It should also be understood, B is determined based on A does not mean that B is determined only based on A, and may be that B is determined based on A and/or other information.

Those skilled in the art will appreciate that some or all of the steps of the various methods of the embodiments may be performed by a program instructing related hardware, and the program may be stored in a computer-readable storage medium. The computer-readable storage medium may be a read-only memory (ROM), a random access memory (RAM), a programmable read-only memory (PROM), an erasable programmable read-only memory (EPROM), an one-time programmable read-only memory (OTPROM), an electrically-erasable programmable read-only memory (EEPROM), a compact disc read-only memory (CD-ROM) or other optical disk storage, a magnetic disk storage, a magnetic tape storage, or any other computer-readable medium that can be used to carry or store data.

The foregoing gives a detail description for the method, apparatus, electronic device and storage medium for specific target-oriented social media tweet sentiment analysis according to embodiments of the invention. The principle and embodiments of the invention are described in specific examples herein, and the description of the above embodiments is merely used to help understanding the method and its core idea of the invention. Moreover, for those skilled in the art, there may be modifications in the specific embodiments and the application range according to the concept of the invention, and sum up, the contents of the specification should not be construed as limiting the invention.

What is claimed is:

1. A specific target-oriented social media tweet sentiment analysis method, comprising:

preprocessing social media tweet data to obtain a target text and a specific target;

passing the target text through an embedding layer to obtain target text word vectors, and passing the specific target through the embedding layer to obtain a specific target word vector;

passing the target text word vectors through a self-attention structure to obtain a self-attention result;

combining the self-attention result with the specific target word vector and passing through a cross-attention structure to obtain cross-attention results;

concatenating the cross-attention results to obtain an attention representation matrix; and passing the attention representation matrix sequentially through a pooling layer, a fully connected layer and a softmax layer to obtain a sentiment tendency result of the specific target;

wherein the passing the target text word vectors through a self-attention structure to obtain a self-attention result comprises:

passing the target text word vectors through a local self-attention structure to obtain a local self-attention result;

passing the target text word vectors through a self-attention structure containing position information to obtain a position self-attention result; and combining the local self-attention result and the position self-attention result to obtain the self-attention result;

wherein the passing the target text word vectors through a local self-attention structure to obtain a local self-attention result comprises:

acquiring interaction information between each word and a neighboring word thereof by the local self-attention structure, wherein an expression formula of the local self-attention structure is as follows:

$$\text{Attention}_{local} = \text{softmax}\left(\frac{(W_q \cdot x) K_A^T}{\sqrt{d}}\right) V_A$$

where, $K_A = (W_k \cdot x_i)_{i \in A}$, $V_A = (W_v \cdot x_i)_{i \in A}$;

wherein sizes of a key matrix and a value matrix of local self-attention matrices are restricted by a matrix A to obtain a local attention representation of one word; and an expression of the matrix A is as follows:

$$A = \{j-k, \ldots, j-1, j, j+a, \ldots, j+k, t\}$$

where, j represents a position of current word x, k represents a size of "local", t represents a position of the specific target; repeating this operation for each word in the social media tweet data, j in the matrix A is varied accordingly, and a single-head local self-attention result is obtained by concatenating all results;

using a multi-head local attention mechanism by: repeating the local self-attention structure at least three times, and choosing different the parameter matrices $W_q$, $W_k$, and $W_v$ to obtain multiple different local attention representations; and concatenating all the local attention representations, and performing parameter matrix projection to obtain the local self-attention result.

2. The specific target-oriented social media tweet sentiment analysis method as claimed claim 1, wherein the preprocessing social media tweet data comprises:

cleansing the social media tweet data to delete symbols, garbage characters and duplicated data information in the social media tweet data and thereby obtain the target text;

performing word segmentation processing on the target text to obtain text word sequences; and converting the text word sequences into text vectors to obtain the target text word vectors.

3. An electronic device, comprising: a memory stored with executable program codes, and a processor coupled to the memory; wherein the processor is configured to call the executable program codes stored in the memory to perform the specific target-oriented social media tweet sentiment analysis method as claimed in claim 2.

4. The specific target-oriented social media tweet sentiment analysis method as claimed claim 1, before the pre-processing social media tweet data, further comprising:

constructing related dictionaries; wherein the related dictionaries comprise a target key dictionary, a target sentiment dictionary, and a word segmentation dictionary;

wherein constructing the target key dictionary comprises:

selecting a corpus containing the target text, performing word segmentation and parts of speech tagging on the corpus by using an existing word segmentation library, and selecting required parts of speech; and performing importance statistics on target words in the target text, inputting the target words of which importances each exceed a preset value into the target key dictionary, and establishing a stop word list and deleting invalid words;

wherein constructing the target sentiment dictionary comprises:

combining an existing sentiment dictionary with a manually constructed sentiment dictionary to obtain the target sentiment dictionary; and obtaining a sentiment value of each sentiment word in the target sentiment dictionary;

wherein constructing the word segmentation dictionary comprises:

combining the target key dictionary, the target sentiment dictionary and the existing word segmentation library to obtain the word segmentation dictionary; and encoding segmentation words in the word segmentation dictionary to obtain segmentation word vectors.

5. The specific target-oriented social media tweet sentiment analysis method as claimed claim 4, before the passing the attention representation matrix sequentially through a pooling layer, a fully connected layer and a softmax layer to obtain a sentiment tendency result of the specific target, further comprising:

constructing a bidirectional encoder representation from transformers (BERT) pre-training model of the target text, performing dimensionality reduction on the target text, and extracting vector representations containing semantic information, to obtain a unique vector corresponding to each word in the target text; and fusing sentiment information codes of the target text into the target sentiment dictionary to obtain the target text word vectors, but for a word not in the target sentiment dictionary, taking an average value of sentiment information code as the target text word vector.

6. An electronic device, comprising: a memory stored with executable program codes, and a processor coupled to the memory; wherein the processor is configured to call the executable program codes stored in the memory to perform the specific target-oriented social media tweet sentiment analysis method as claimed in claim 5.

7. An electronic device, comprising: a memory stored with executable program codes, and a processor coupled to the memory; wherein the processor is configured to call the executable program codes stored in the memory to perform the specific target-oriented social media tweet sentiment analysis method as claimed in claim 4.

8. The specific target-oriented social media tweet sentiment analysis method as claimed in claim 1, wherein the passing the target text word vectors through a self-attention structure containing position information to obtain a position self-attention result comprises:
  making the target text word vectors contain the position information through a bidirectional long short-term memory (Bi-LSTM) network;
  a forward LSTM comprising an input gate, a forget gate and an output gate, passing the target text word vectors through the forward LSTM to obtain a word vector $\vec{h}_t$, processing the target text word vectors by a backward LSTM to obtain a word vector $\overleftarrow{h}_t$, and integrating the word vector $\vec{h}_t$ and word vector $\overleftarrow{h}_t$, wherein an integration function is as follows:

$$x_t = f(\overleftarrow{h}_t)$$

where, f is an operation of adding or concatenating into one vector, $X=\{x_1, x_2, \ldots, x_n\}$ represents a text vector containing position information;
  performing a self-attention operation on the text vector, wherein an operation function is as follows:

$$\text{Attention}_{self} = \text{softmax}\left(\frac{Q \cdot K^T}{\sqrt{d}}\right)V;$$

multiplying the text vector by three parameter matrices individually to obtain a query matrix Q, a key matrix K and a value matrix V, thereby obtaining a single-head self-attention result; and
  obtaining a plurality of self-attention results by using different the query matrices, the key matrices and the value matrices, and performing concatenation and parameter matrix dimensionality-reduced projection on the plurality of self-attention results to obtain the position self-attention result.

9. An electronic device, comprising: a memory stored with executable program codes, and a processor coupled to the memory; wherein the processor is configured to call the executable program codes stored in the memory to perform the specific target-oriented social media tweet sentiment analysis method as claimed in claim 8.

10. The specific target-oriented social media tweet sentiment analysis method as claimed in claim 1, wherein the combining the self-attention result with the specific target word vector and passing through a cross-attention structure to obtain cross-attention results comprises:
  using the specific target word vector to perform cross-attention operations with the local self-attention result and the position self-attention result individually as follows:

$$\text{Attention}_{cross} = \text{softmax}\left(\frac{T \cdot K_c^T}{\sqrt{d}}\right)V_c$$

where, T represents a result of the specific target word vector passing through a parameterization matrix, $K_c$ and $V_c$ respectively represent results of passing the local self-attention result through two parameterization matrices individually;
  using different parameterization matrices to obtain multi-head cross-attention results, and using a parameterization matrix after concatenation of the multi-head cross-attention results to reduce a dimensionality of the result and thereby obtain a cross-attention result of the specific target vector and the local self-attention result; and
  modifying $K_c$ and $V_c$ as results of passing the position self-attention result through two parameterization matrices individually, to obtain a cross-attention result of the specific target vector and the position self-attention result;
  wherein the attention representation matrix is obtained by concatenating the cross-attention result of the local self-attention result and the cross-attention result of the position self-attention result.

11. The specific target-oriented social media tweet sentiment analysis method as claimed in claim 10, wherein the passing the attention representation matrix sequentially through a pooling layer, a fully connected layer and a softmax layer to obtain a sentiment tendency result of the specific target, comprises:
  passing the attention representation matrix through the pooling layer, and obtaining an output result of the pooling layer by using a maximum pooling method;
  inputting the output result of the pooling layer into the fully connected layer to obtain a score value of each sentiment;
  inputting the score value of each the sentiment into the softmax layer for operation to obtain a probability value of each the sentiment; and
  taking the sentiment with a maximum probability value as the sentiment tendency result of the specific target.

12. An electronic device, comprising: a memory stored with executable program codes, and a processor coupled to the memory; wherein the processor is configured to call the executable program codes stored in the memory to perform the specific target-oriented social media tweet sentiment analysis method as claimed in claim 11.

13. An electronic device, comprising: a memory stored with executable program codes, and a processor coupled to the memory; wherein the processor is configured to call the executable program codes stored in the memory to perform the specific target-oriented social media tweet sentiment analysis method as claimed in claim 10.

14. An electronic device, comprising: a memory stored with executable program codes, and a processor coupled to the memory; wherein the processor is configured to call the executable program codes stored in the memory to perform the specific target-oriented social media tweet sentiment analysis method as claimed in claim 1.

* * * * *